US011923938B2

(12) United States Patent
Petersson et al.

(10) Patent No.: US 11,923,938 B2
(45) Date of Patent: *Mar. 5, 2024

(54) BEAMFORMED TRANSMISSION TOWARDS GROUPS OF TERMINAL DEVICES

(71) Applicant: Telefonaktiebolaget LM Ericsson (publ), Stockholm (SE)

(72) Inventors: Sven Petersson, Sävedalen (SE); Andreas Nilsson, Gothenburg (SE); Fredrik Athley, Kullavik (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,016

(22) Filed: Mar. 17, 2023

(65) Prior Publication Data

US 2023/0224000 A1    Jul. 13, 2023

Related U.S. Application Data

(63) Continuation of application No. 16/464,935, filed as application No. PCT/EP2019/062586 on May 16, 2019, now Pat. No. 11,626,910.

(51) Int. Cl.
*H04B 7/06* (2006.01)
*H04J 1/02* (2006.01)
*H04W 72/0453* (2023.01)

(52) U.S. Cl.
CPC .............. *H04B 7/0617* (2013.01); *H04J 1/02* (2013.01); *H04W 72/0453* (2013.01)

(58) Field of Classification Search
CPC ..... H04B 7/0617; H04J 1/02; H04W 72/0453
See application file for complete search history.

(56) References Cited

U.S. PATENT DOCUMENTS

| 2015/0085761 A1 | 3/2015 | Maltsev et al. |
| 2019/0044689 A1 | 2/2019 | Yiu et al. |

(Continued)

FOREIGN PATENT DOCUMENTS

| CN | 106688265 A | 5/2017 |
| JP | 2015-523004 | 8/2015 |

(Continued)

OTHER PUBLICATIONS

International Search Report and Written Opinion issued in International Application No. PCT/EP2019/062586 dated Dec. 20, 2019 (21 pages).

(Continued)

*Primary Examiner* — Faruk Hamza
*Assistant Examiner* — Aixa A Guadalupe Cruz
(74) *Attorney, Agent, or Firm* — Rothwell, Figg, Ernst & Manbeck, P.C.

(57) ABSTRACT

A method for beamformed transmission towards groups of terminal devices. Each terminal device is, according to a bandwidth part (BWP) configuration, configured with a BWP set. One BWP in the BWP set is an active BWP for the terminal device. The method is performed by a network node. The method comprises configuring a new terminal device entering one of the groups with an active BWP based on frequency overlap avoidance with the active BWPs of the terminal devices already part of the group entered. The method comprises serving all terminal devices by performing beamformed transmission towards the terminal devices in accordance with the active BWPs.

20 Claims, 7 Drawing Sheets

(56) References Cited

U.S. PATENT DOCUMENTS

| | | |
|---|---|---|
| 2019/0045481 A1 | 2/2019 | Sang |
| 2019/0222290 A1* | 7/2019 | Ly ........................ H04L 5/0098 |
| 2020/0052865 A1* | 2/2020 | Liou ................ H04W 74/0808 |
| 2020/0235895 A1 | 7/2020 | Srinivasan |
| 2021/0051701 A1 | 2/2021 | Fakoorian |
| 2021/0058940 A1* | 2/2021 | Choi ..................... H04L 5/0092 |
| 2021/0378018 A1* | 12/2021 | Jang ................... H04W 74/006 |

FOREIGN PATENT DOCUMENTS

| | | |
|---|---|---|
| WO | 2014/190547 A1 | 12/2014 |
| WO | 2019/051177 A1 | 3/2019 |

OTHER PUBLICATIONS

Vivo, "Discussion on the channel access procedures", 3GPP TSG RAN WG1 Meeting #94bis, R1-1810382, Chengdu, China, Oct. 2018 (8 pages).

Intel Corporation, "Corrections to NR mobility measurements", 3GPP TSG RAN WG1 Meeting #94, R1-1808666, Gothenburg, Sweden, Aug. 2018 (6 pages).

Samsung, "On UE adaptation Schemes", 3GPP TSG RAN WG1 RAN1 Meeting #96, R1-1902318, Athens, Greece, Mar. 2019 (15 pages).

Huawei et al., "Overview of bandwidth part, CA, and DC operation including SRS switching", 3GPP TSG RAN WG1 Meeting NR#3, R1-1715425, Nagoya, Japan, Sep. 18-21, 2017 (14 pages).

* cited by examiner

BEAMFORMED TRANSMISSION TOWARDS GROUPS OF TERMINAL DEVICES

CROSS-REFERENCE TO RELATED APPLICATIONS

This application is a continuation of Ser. No. 16/464,935, filed on 2019 May 29 now U.S. Pat. No. 11,626,910, issued on Apr. 11, 2023), which is the 35 U.S.C. § 371 National Stage of International Patent Application No. PCT/EP2019/062586, filed 2019 May 16. The above identified applications are incorporated by this reference.

TECHNICAL FIELD

Embodiments presented herein relate to a method, a network node, a computer program, and a computer program product for beamformed transmission towards groups of terminal devices.

BACKGROUND

In some communication systems, such as over the New Radio (NR) air interface in the third generation partnership project (3GPP) suite of telecommunication standards and specifications, a terminal device can be configured with bandwidth parts (BWPs), which means that the terminal device is only configured to operate in a fraction of the full carrier bandwidth of the communication system. This might be advantageous for communication system operating using millimeter wave (mmWave) frequencies where the carrier frequencies are expected to be in the order of several hundreds of megahertz (MHz), for example having a carrier up to 400 MHz. Terminal devices might not be capable of supporting transmission and/or reception of signals using such large bandwidths. Further, using such large bandwidth for transmission and/or reception might have a negative impact of the power consumption of the terminal device and for the link budget for reference signals, etc. Each terminal device might therefore be allocated BWPs covering only a fraction of the full carrier bandwidth.

Terminal devices might thus be allocated BWPs which are smaller than the full carrier bandwidth. If at least some of these BWPs are located at different parts of the full carrier bandwidth for different terminal devices, frequency division multiplexing (FDM) can be applied for simultaneous transmission to multiple terminal devices whilst still using the full BWP for each terminal device. However, in some communication systems based on beamforming, only a single beam can be used at each time instant. This means that in addition to terminal devices having BWPs at separate frequency bands, the terminal devices should also be located in similar directions, such that one single high gain beam as generated by a network node at the network side of the communication system could reach them. This might not always be the case.

Hence, there is still a need for improved beamformed transmission in communication systems.

SUMMARY

An object of embodiments herein is to provide efficient beamformed transmission towards groups of terminal devices in a communication system.

According to a first aspect there is presented a method for beamformed transmission towards groups of terminal devices. Each terminal device is, according to a bandwidth part (BWP) configuration, configured with a BWP set. One BWP in the BWP set is an active BWP for the terminal device. The method is performed by a network node. The method comprises configuring a new terminal device entering one of the groups with an active BWP based on frequency overlap avoidance with the active BWPs of the terminal devices already part of the group entered. The method comprises serving all terminal devices by performing beamformed transmission towards the terminal devices in accordance with the active BWPs.

According to a second aspect there is presented a network node beamformed transmission towards groups of terminal devices. Each terminal device is, according to a BWP configuration, configured with a BWP set. One BWP in the BWP set is an active BWP for the terminal device. The network node comprises processing circuitry. The processing circuitry is configured to cause the network node to configure a new terminal device entering one of the groups with an active BWP based on frequency overlap avoidance with the active BWPs of the terminal devices already part of the group entered. The processing circuitry is configured to cause the network node to serve all terminal devices by performing beamformed transmission towards the terminal devices in accordance with the active BWPs.

According to a third aspect there is presented network node for beamformed transmission towards groups of terminal devices. Each terminal device is, according to a BWP configuration, configured with a BWP set. One BWP in the BWP set is an active BWP for the terminal device. The network node comprises a configure module ($210a$) configured to configure a new terminal device entering one of the groups with an active BWP based on frequency overlap avoidance with the active BWPs of the terminal devices already part of the group entered. The network node comprises a serve module configured to serve all terminal devices by performing beamformed transmission towards the terminal devices in accordance with the active BWPs.

According to a fourth aspect there is presented a computer program for beamformed transmission towards groups of terminal devices, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient beamformed transmission towards the groups of terminal devices.

Advantageously this enables efficient FDM of terminal devices by a network node using analog beamforming and in a communication system operating using mmWave frequencies.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
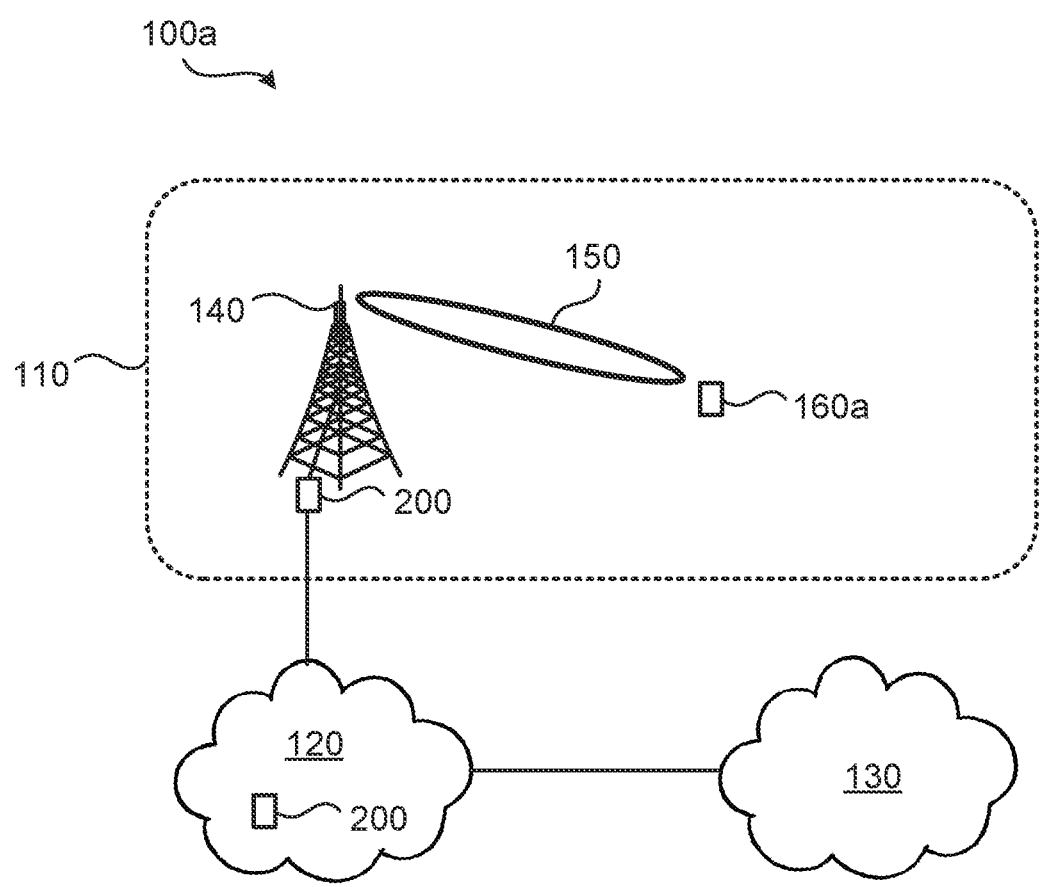
FIGS. 1, 3, and 4 are schematic diagrams illustrating communication systems according to embodiments.

FIG. 1 is a schematic diagram illustrating a communication system 100a where embodiments presented herein can be applied. The communication system 100a comprises a network node 200 configured to, in a beam 150 generated by a transmission and reception point (TRP) 140, provide network access over one or more radio propagation channels to a terminal device 160a in a radio access network 110. Non-limited examples of terminal devices 160a are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. In some embodiments the network node 200 is part of, integrated with, or collocated with a radio base station, base transceiver station, node B, evolved node B, gNB, access point, or the like. The radio access network 110 is operatively connected to a core network 120. The core network 120 is in turn operatively connected to a packet data network 130, such as the Internet. The terminal device 160a is thereby, via the network node 200 and its TRP 140, enabled to access services of, and exchange data with, the service network 130.

As noted above there is a need for improved beamformed transmission in communication systems 100a. The embodiments disclosed herein therefore relate to mechanisms for beamformed transmission towards groups 190a:190c of terminal devices 160a:160f. In order to obtain such mechanisms there is provided a network node 200, a method performed by the network node 200, a computer program product comprising code, for example in the form of a computer program, that when run on a network node 200, causes the network node 200 to perform the method.

Figure 2:
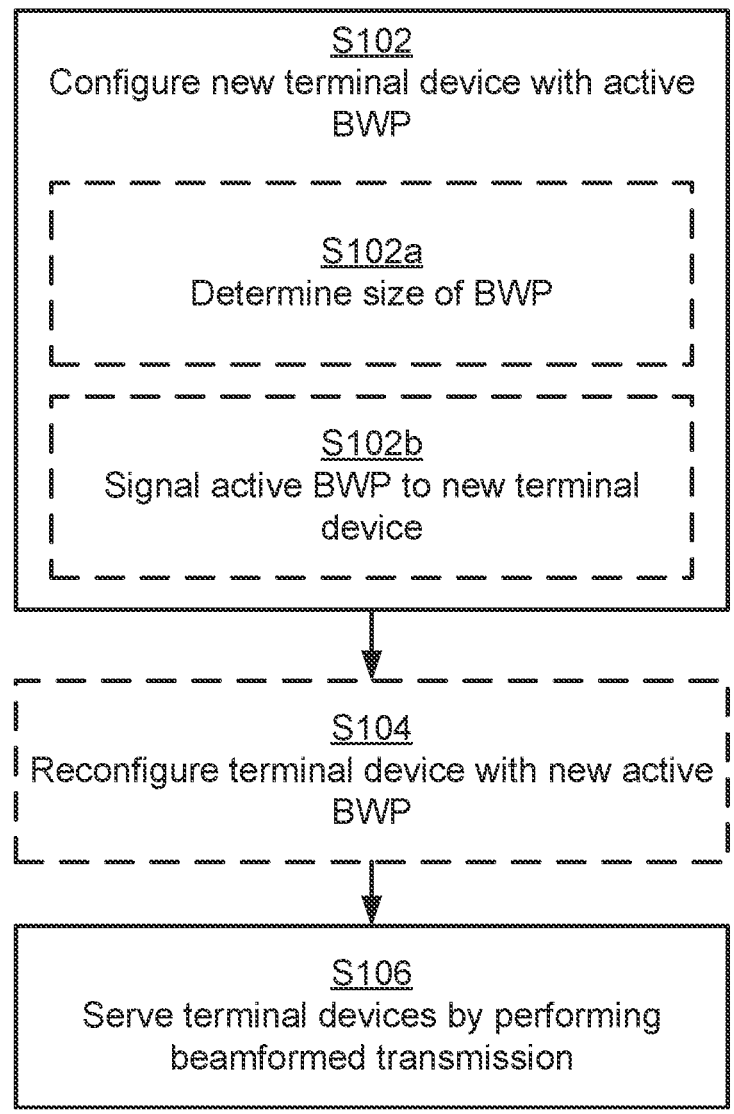
FIG. 2 is a flowchart of methods according to embodiments.

FIG. 2 is a flowchart illustrating embodiments of methods for beamformed transmission towards groups 190a:190c of terminal devices 160a:160f. Each terminal device 160a:160f is, according to a BWP configuration, configured with a BWP set. One BWP in the BWP set is an active BWP 170a:170d for the terminal device 160a:160f. The methods are performed by the network node 200. The methods are advantageously provided as computer programs 720.

It is assumed that a new terminal device 160c is to be served by the network node 200. The network node 200 therefore configures an active BWP 170c for this new terminal device 160c. In particular, the network node 200 is configured to perform S102:

S102: The network node 200 configures a new terminal device 160c entering one of the groups 190a:190c with an active BWP 170c. The active BWP 170c is based on frequency overlap avoidance with the active BWPs 170a, 170b, 170d, 170e, 170f of the terminal devices 160a, 160b, 160d, 160e, 160f already part of the group entered.

The new terminal device 160c is then by the network node 200 served together with the remaining terminal devices. In particular, the network node 200 is configured to perform S106:

S106: The network node 200 serves all terminal devices 160a:160f. The terminal devices 160a:160f are served by the network node 200 performing beamformed transmission towards the terminal devices 160a:160f. The beamformed transmission is performed in accordance with the active BWPs 170a:170f.

With respect to the beamformed transmission, it is noted that a terminal device 160a:160c might not be served in the same beam that defines the group, or vice versa. For example, a group might be defined by a wide beam whereas the terminal device within that group are served using narrow beams; the beamformed transmission is to be performed in, or within coverage of, the beam (wide or narrow) that defines the group.

Embodiments relating to further details of beamformed transmission towards groups 190a:190c of terminal devices 160a:160f as performed by the network node 200 will now be disclosed.

There could be different ways for the network node 300 to serve the terminal devices 160a:160f. According to an embodiment, the network node 200 is configured to serve one group 190a:190c of terminal devices 160a:160f per transmission beam 150, B1:B12 using FDM.

According to an embodiment, the network node 200 is configured to serve the terminal devices 160a:160f using analog beamforming.

There may be different ways to define the frequency overlap avoidance. In some aspects the frequency overlap avoidance is defined by means of a threshold value. The threshold value might define what percentage the active BWPs are allowed to overlap per each group 190a:190c of terminal devices 160a:160c. According to an embodiment, according to the frequency overlap avoidance, the new terminal device 160c is configured with an active BWP 170c having a frequency overlap with the active BWPs 170a, 170b, 170d, 170e, 170f of the terminal devices 160a, 160b, 160d, 160e, 160f already part of the group 190a:190c not being larger than a threshold overlap. That is, the active BWP 170c of the new terminal device 160c might be selected to not frequency-wise overlap with the active BWPs 170a, 170b, 170d, 170e, 170f more than a certain percentage. The percentage is given by the threshold overlap. What threshold overlap to use might depend on traffic type, number of terminal devices per group, the size of the BWPs, etc. In some aspects the frequency overlap avoidance is defined to be as small as possible. According to an embodiment, according to the threshold overlap, the new terminal device 160c is thus configured with an active BWP 170c having a minimum frequency overlap with the active BWPs 170a, 170b, 170d, 170e, 170f of the terminal devices 160a, 160b, 160d, 160e, 160f already part of the group 190a:190c.

By minimizing the BWP overlap for terminal devices within the same group, the possibility for using FDM among these terminal devices, without having to reduce the scheduling bandwidth for these terminal devices, increases. Co-scheduling using FDM can be applied both in downlink and uplink, or in only downlink, or in only uplink.

There could be different ways to group the terminal devices 160a:160f in the groups 190a:190c. In some aspects, since beamformed transmission is to be performed towards the terminal devices 160a:160f, the groups 190a:190c might be formed with respect to a spatial relation criterion among the terminal devices 160a:160f. That is, according to an embodiment, the terminal devices 160a:160f are grouped according to a spatial relation criterion. In some examples the spatial relation criterion is defined such that terminal devices 160a:160f served in the same beam belong to the same group. In some aspects, since the terminal devices 160a:160f are to be group-wise served (i.e., one group per time), the groups 190a:190c might be formed with respect to the traffic need of the the terminal devices 160a:160f. That is, according to an embodiment, the terminal devices 160a:160f are grouped according to a traffic need criterion. For example, in case a number of terminal devices within a certain spatial direction is expected to have comparatively small traffic needs, these terminal devices might be allowed to have overlapping BWPs when grouped together since, because of the small traffic need, these terminal devices might not need their full BWP every time they are scheduled. On the other hand, if there are some terminal devices that are expected to have comparatively high traffic demands and thus are likely to need their full BWP when being scheduled, these terminal devices might be configured with non-overlapping BWPs when being grouped (either with each other or with other terminal devices). Thus, according to an embodiment, the amount of frequency overlap avoidance is based on type of traffic need for the new terminal device 160c and type of traffic need for the terminal devices 160a, 160b, 160d, 160e, 160f already part of the group entered. The expected traffic need can be attained through buffer status reports, or by obtaining information (such as by deep packet inspection; DPI) of which applications the terminal devices 160a:160f are running, or what type of terminal devices they are (such as UEs, IoT devices, network equipped vehicles, etc.), where each type of terminal device could have different requirements on latency, throughput, traffic amount, etc. and other types of traffic need.

Further, there might be different sizes of the BWPs. That is, according to an embodiment, there are at least two different sizes of the BWPs. The network node 200 might then determine the size of the BWPs. Particularly, according to an embodiment, the network node 200 is configured to perform (optional) step S102a as part of configuring the new terminal device 160c with the active BWP 170c in S102:

S102a: The network node 200 determines the size of the active BWP 170c with which the new terminal device 160c is configured.

The size of the active BWP 170c could then be determined such that the frequency overlap avoidance with the active BWPs 170a, 170b, 170d, 170e, 170f of the terminal devices 160a, 160b, 160d, 160e, 160f already part of the group entered is minimized, or at least no higher than the threshold overlap.

Alternatively, all BWPs are of the same size.

There might be different ways to implement the configuration by the network node 200 of the new terminal device 160c. That is, there might be different ways for the network node 200 to make the new terminal device 160c aware of its configuration. In some aspects the network node 200 signals the active BWP 170c to the new terminal device 160c. That is, according to an embodiment, the network node 200 is configured to perform (optional) step S102b as part of configuring the new terminal device 160c with the active BWP 170c in S102:

S102b: The network node 200 signals the active BWP 170c to the new terminal device 160c.

There could be different ways for the network node 200 to signal the active BWP 170c to the new terminal device 160c. According to a first example, the configuration of the active BWP is signal using radio resource control (RRC) signalling. According to a second example, a switch to the active BWP is made using downlink control information (DCI) signalling. The signalling could comprise an index to a BWP already known by the terminal device 160c (such as an index to a BWP in a default BWP set) or explicit details regarding location of the BWP in the frequency domain (for example when the terminal device 160c is not configured with a default BWP set or where the active BWP is not part of the default BWP set).

The configuration of the new terminal device 160c with an active BWP 170c might cause the active BWP of one or more of the terminal devices already part of the group to be changed. Particularly, according to an embodiment, the network node 200 I configured to perform (optional) step S104:

S104: The network node 200 reconfigures at least one of the terminal devices 160a, 160b, 160d, 160e, 160f already part of the group entered with a new active BWP.

This at least one of the terminal devices 160a, 160b, 160d, 160e, 160f might then be made aware of the reconfiguration in the same way as disclosed above in S102b for the new terminal device 160c.

Hence, in some aspects, when the new terminal device 160 enters one of the groups 190a:190c, the network node 200 might evaluate which candidate BWPs and active BWPs all terminal devices of the group have and determine an optimal way to distribute all active BWPs for all terminal devices of the group according to a frequency overlap avoidance criterion, for example to minimize the overlap between the BWPs. This might be needed in order to minimize the overlap of all active BWPs of the terminal devices in the group. According to an embodiment, the at least one of the terminal devices 160a, 160b, 160d, 160e, 160f already part of the group entered is reconfigured with the new active BWP based on frequency overlap avoidance with the active BWPs 170a, 170b, 170d, 170e, 170f of the remaining terminal devices 160a, 160b, 160d, 160e, 160f already part of the group entered and the active BWP 170c of the new terminal device 160c.

In some aspects the active BWP 170c is selected from a default BWP set with which the new terminal device 160c at some point has been configured with. For example, the new terminal device 160c might be configured with the default BWP set upon being served by the network node 200. That is, according to an embodiment, the new terminal device 160c is configured with a default BWP set, and the active BWP 170c with which the new terminal device 160c is configured is selected from this BWP set. In other aspects the active BWP 170c is not selected from the default BWP set. That is, according to an embodiment, the active BWP 170c with which the new terminal device 160c is configured is selected outside the default BWP set.

There could be different reasons for the new terminal device 160c to enter one of the groups 190a:190c.

In some aspects the new terminal device 160c is handed over to the TRP 140 (or network node 200) from another TRP (or network node). That is, according to an embodiment, the new terminal device 160c is handed over to the network node 200 from another network node 200. This will be disclosed in more detail below with reference to the communication system 100b of FIG. 3.

In other aspects, the new terminal device 160c enters RRC connected mode from RRC idle mode or RRC inactive mode. That is, according to an embodiment, the new terminal device 160c is entered into one of the groups 190a:190c upon the network node 200 having received a request for initial network access from the new terminal device 160c. This will also be disclosed in more detail below with reference to the communication system 100b of FIG. 3.

In yet other aspects the new terminal device 160c is handed over between two beams of the same TRP 140. That is, according to an embodiment, the new terminal device 160c is handed over from a transmission beam 150, B1:B12 serving another one of the groups 190a:190c. This will be disclosed in more detail below with reference to the communication system 100c of FIG. 4.

A short disclosure of synchronization signal blocks (SSBs) will be useful to have in the following. In general terms, an SSB is a signal broadcasted over the NR air interface. SSB can be used for providing initial synchronization and basic system information and be used for initial access and mobility measurements. One type of SSB is cell defining SSBs and another type of SSB is non-cell defining SSBs. Cell defining SSBs are used for initial access, radio link monitoring (RLM) and intra-frequency Radio Resource Management (RRM) purposes. The cell defining SSBs might be located in the initial BWP. Non-cell defining SSBs might be configured for terminal devices in connected mode and be used for RLM or inter-frequency RRM purposes. The non-cell defining SSBs might be located in a dedicated BWP (i.e. a BWP different from the initial BWP). According to an embodiment, each respective transmission beam 150, B1:B12 is associated with its own SSB, or channel state information reference signals (CSI-RS).

Figure 3:
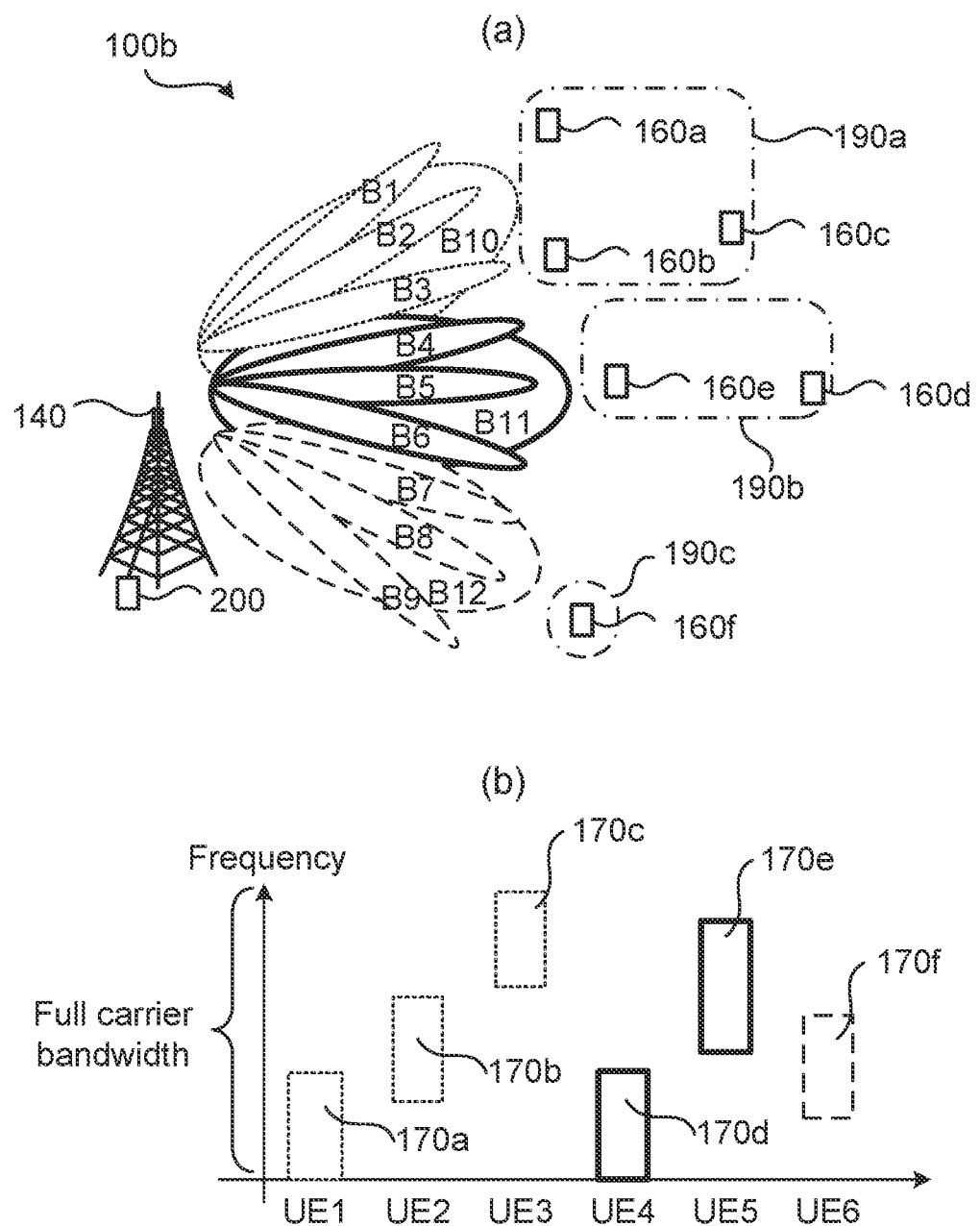

Reference will now be made to FIG. 3 illustrating at (a) a communication system 100b and at (b) allocation of active BWPs 170a:170f according to an embodiment. The communication system 100b is similar to that of FIG. 1 and shows in more detail beamforming in beams B1:B12 as performed at the TRP 140 of the network node 200 and groups 190a:190c of terminal devices 160a:160f (at (b) denoted UE1:UE6). In the example of FIG. 3, the TRP 140 is utilizing three different wide beams B10:B12 that together covers the full serving sector, where one SSB is transmitted per wide beam. In addition, the TRP 140 also has configured three periodic wideband CSI-RSs (CSI-RS1, CSI-RS2, CSI-RS3) that are transmitted in the three wide beams B10:B12. One purpose of the CSI-RSs is to perform a beam management procedure for the served terminal devices 160a:160f that move around in the cell. Since the CSI-RS are wideband, all terminal devices 160a:160f regardless BWP can use the CSI-RS. It is also possible to configure additional non-cell defining SSBs that are located in different part of the carrier frequency band for the beam management procedure, instead of using the wideband periodic CSI-RSs. In turn, the wide beams B10:B12 each cover three narrow beams B1:B9 with higher gains. These narrow beams B1:B9 could be used if needed during data transmission to increase the path gain even further.

At FIG. 3(b) is, for simplicity, illustrated only one single BWP 170a:170f for each terminal device 160a:160f. Hence, in this example, each BWP set consists of a single BWP. However, as the skilled person understands, each BWP might comprise two or more BWPs. Particularly, according to an embodiment, each BWP set comprises at least four BWPs, one of which being the active BWP 170a:170f. As noted above, each BWP covers less than the whole carrier bandwidth. In some aspects this is true also when considering the whole BWP set. That is, according to an embodiment, each BWP set only partly covers the carrier bandwidth.

In the example of FIG. 3, the terminal devices 160a:160f have been grouped in groups 190a:190c corresponding to the wide beams B10:B12, where terminal device 160a and terminal device 160b belong to a first group 190a defined by the spatial direction of wide beam B10, where terminal device 160d and terminal device 160e belong to a second group 190b defined by the spatial direction of wide beam B11, and where terminal device 160f belongs to a third group 190c defined by the spatial direction of wide beam B12.

A new terminal device 160c is to establish a connection (for example when entering RRC connected mode from RRC idle mode or RRC inactive mode) to the network node 200 via the TRP 140 and initiates an initial access procedure where the network node 200 identifies that the best wide beam is beam B10. Based on the information about BWPs of the other two terminal devices 160a, 160b served by beam B10, the network node 200 configures terminal device 160c with a BWP 170c, in accordance with frequency overlap avoidance, that overlaps as little as possible with the BWPs 170a, 170b for terminal devices 160a, 160b. It is also possible that the new terminal device 160c is handed over to beam B10 from another cell. During a handover of a terminal device from one TRP (or network node) to another TRP (or network node), information about which is the preferred SSB beam/CSI-RS beam for that terminal device for the target TRP. Hence, the TRP 160 might obtain information about which group the new terminal device 160c should belong to even before the handover is completed and can therefore perform a proper BWP configuration for the new terminal device 160c. As in the illustrative example of FIG. 3, different terminal devices 160a:160f might be configured with BWPs 170a:170f of different sizes, which might depend on that different terminal devices 160a:160f have different capabilities with respect to the bandwidth in which transmission and/or reception is possible. It is also possible that different terminal devices 160a:160f have different needs to save energy and that the terminal devices 160a:160f that need to save more energy are configured with smaller BWPs.

In terms of FDM, in the example of FIG. 3, terminal devices 160a, 160b, 160c can be co-scheduled transmitting data and/or control signalling (such as, but not limited to, a physical downlink shared channel (PDSCH) and/or a physical downlink control channel (PDCCH)) in the wide beam B10 where the transmission for each of these terminal devices 160a, 160b, 160c can be scheduled over more or less their full BWP. It might also be so that some of the terminal devices have the same strongest narrow beam (for example terminal devices 160b and 160c having beam B3 as strongest narrow beam), and these terminal devices can then be co-scheduled using their best narrow beam.

In a second example the terminal devices 160a:160f are grouped based on the narrow beams B1:B9 instead of the wide beams B10:B12. In this case the network node 200 keeps track of which narrow beam B1:B9 that is best for each terminal device 160a:160f. When the new terminal device 160c is to establish a connection to the network node 200 via the TRP 140, the network node 200 finds the best narrow beam, either through initial access by sweeping narrow reception beams during reception of a random access preamble of, or the new terminal device 160c performs an initial beam sweep (applied on a default BWP), before the new terminal device 160c is configured with the active BWP 170c.

Figure 4:
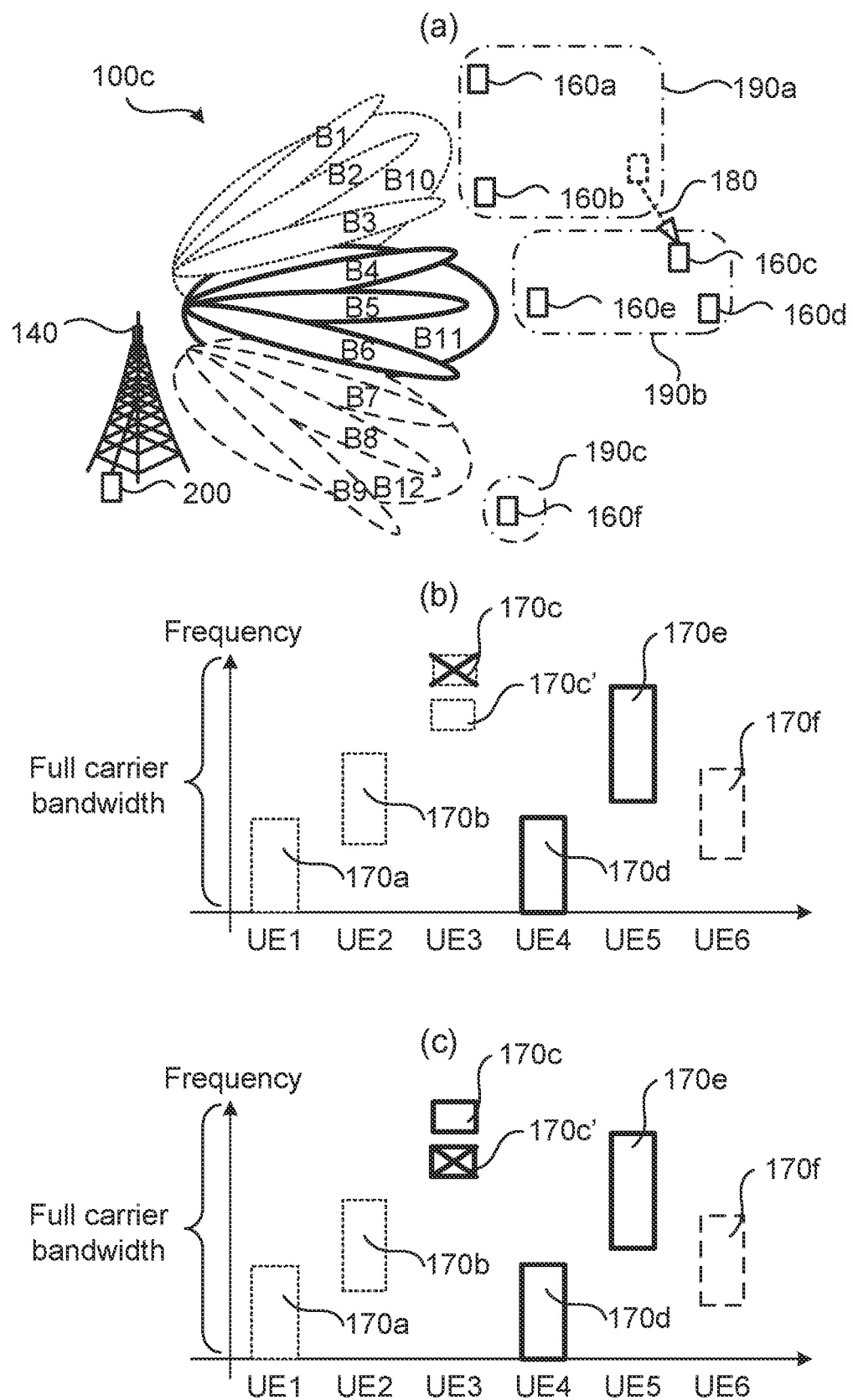

Reference will now be made to FIG. 4 illustrating at (a) a communication system 100b and at (b) allocation of active BWPs 170a:170f according to an embodiment. The communication system 100c is similar to that of FIG. 3 but with the difference that terminal device 160c is with two BWPs 170c, 170c'; one active BWP and one candidate BWP (where in FIG. 4 the candidate BWP has been marked with a cross). According to arrow 180 in the illustrative example of FIG. 4, the terminal device 160c is moving from coverage of beam B10 to coverage of beam B11 and is therefore to enter group 190b to which terminal device 160d and terminal device 160e belong. Terminal devices 160d, 160e have different allocation of active BWPs 170d, 170e compared to terminal devices 160a, 160b. The current active BWP 170c' for terminal device 160c (i.e., the BWP as used by terminal device 160 when served in beam B10) is overlapping with the current active BWP 170e allocated to terminal device 160e. In this case the candidate BWP 170c for terminal device 160c does not overlap with any of the active BWPs 170d, 170e of the two terminal devices 160d, 160e already belonging to group 190b, and therefore the network node 200 initiates a BWP switch from BWP 170c' to BWP 170c for the terminal device 160c using DCI, such that the candidate BWP now becomes the active BWP. The network node 200 might configure each terminal device 160a:160f with a set of (multiple) BWPs located at different parts of the frequency band, and when a given terminal device 160a:160f moves around from one group 190a:190c to another group 190a:190c, the network node 200 evaluates which of the configured BWPs for the given terminal device that overlaps least with the BWPs used by the other terminal devices already belonging to the group the given terminal device is entering.

Figure 5:
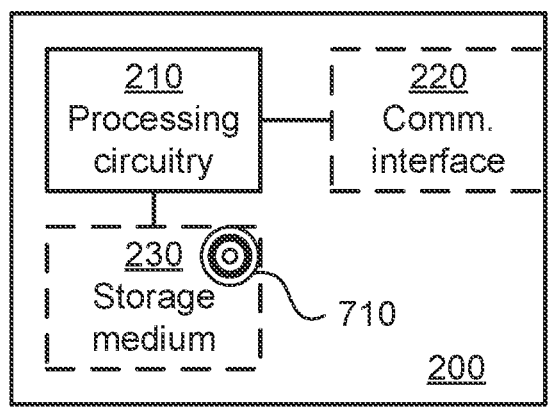
FIG. 5 is a schematic diagram showing functional units of a network node according to an embodiment.

FIG. 5 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other functions, nodes, entities, and devices of the communication systems 100a, 100b, 100c, such as the terminal devices 160a:160f. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 6:
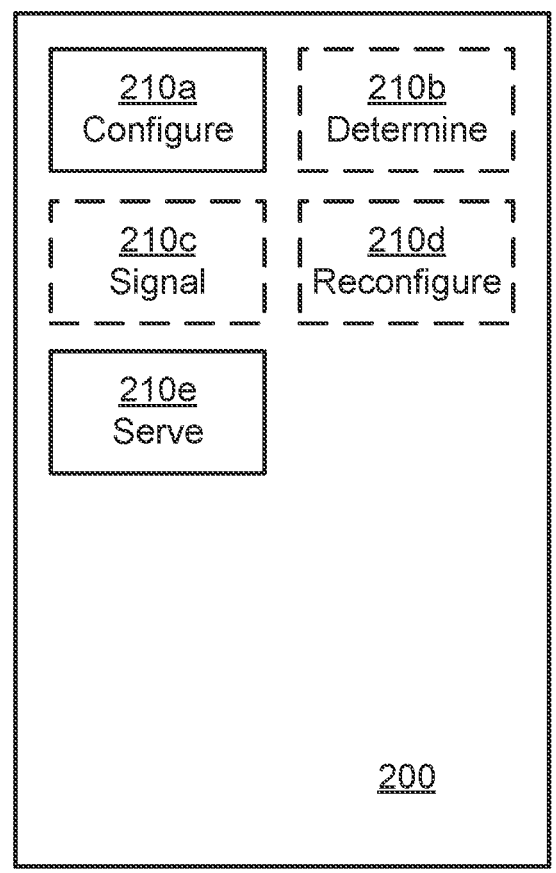
FIG. 6 is a schematic diagram showing functional modules of a network node according to an embodiment.

FIG. 6 schematically illustrates, in terms of a number of functional modules, the components of a network node 200 according to an embodiment. The network node 200 of FIG. 6 comprises a number of functional modules; a configure module 210a configured to perform step S102, and a server module 210e configured to perform step S106. The network node 200 of FIG. 6 may further comprise a number of optional functional modules, such as any of a determine module 210b configured to perform step S102a, a signal module 210c configured to perform step S102b, and a reconfigure module 210d configured to perform step S104. In general terms, each functional module 210a-210e may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The network node 200 may be provided as a standalone device or as a part of at least one further device. For example, the network node 200 may be provided in a node of the radio access network 110 or in a node of the core network 120. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 5 the processing circuitry 210 may be distributed among a plurality of devices, or nodes. The same applies to the functional modules 210a-210e of FIG. 6 and the computer program 720 of FIG. 7.

Figure 7:
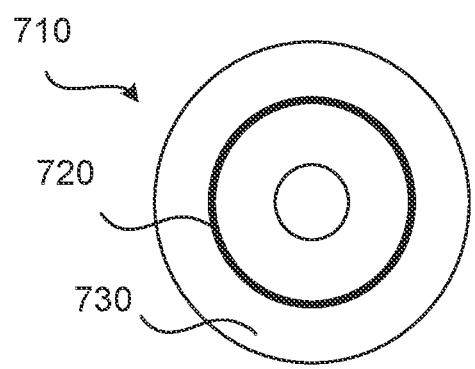
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

Figure 8:
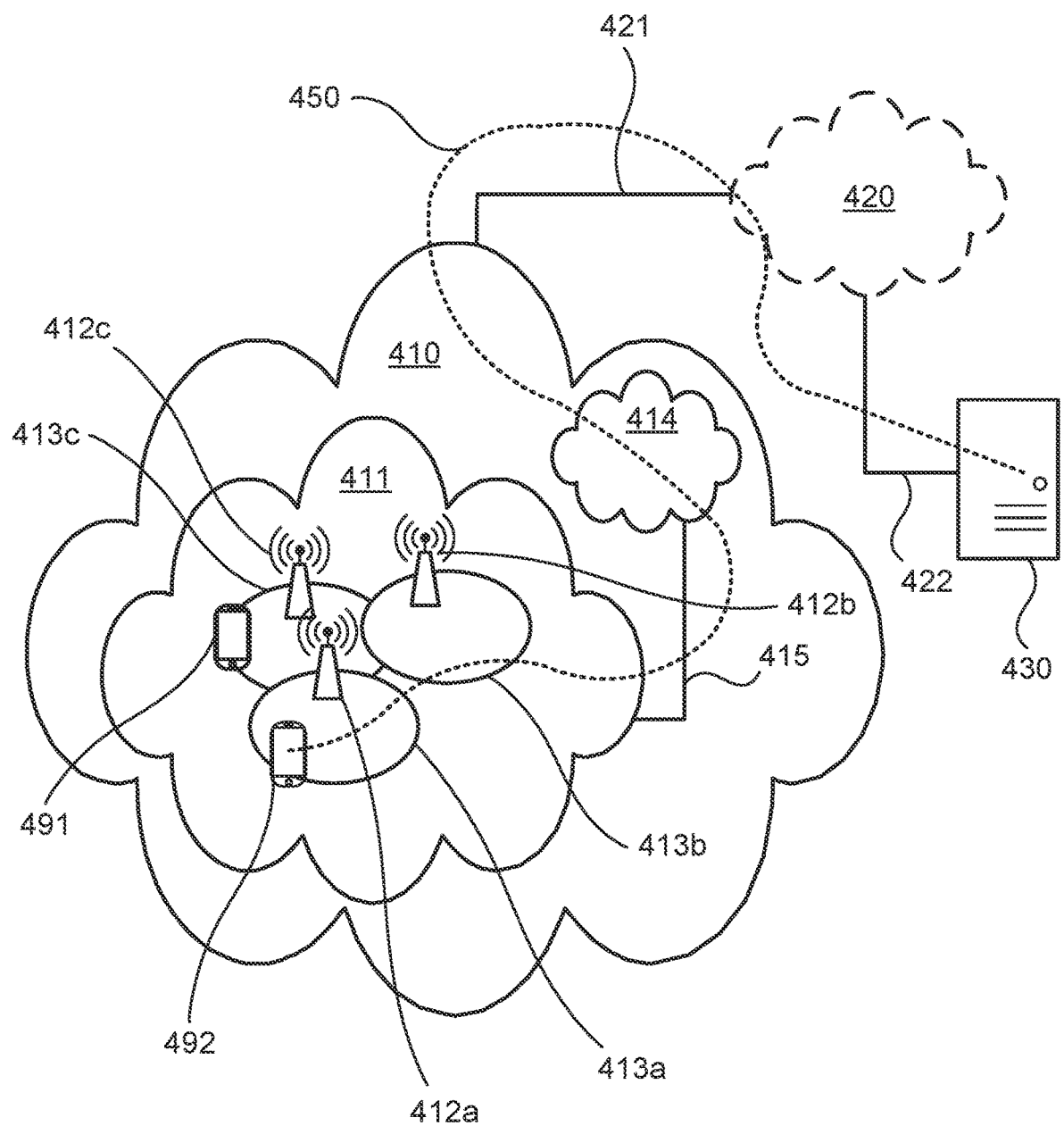
FIG. 8 is a schematic diagram illustrating a telecommunication network connected via an intermediate network to a host computer in accordance with some embodiments.

FIG. 8 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 1. Access network 411 comprises a plurality of radio access network nodes 412a, 412b, 412c, such as NBs, eNBs, gNBs (each corresponding to the network node 200 of FIGS. 1, 3, and 4) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal devices 160a:160f of FIGS. 1, 3, and 4.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 9:
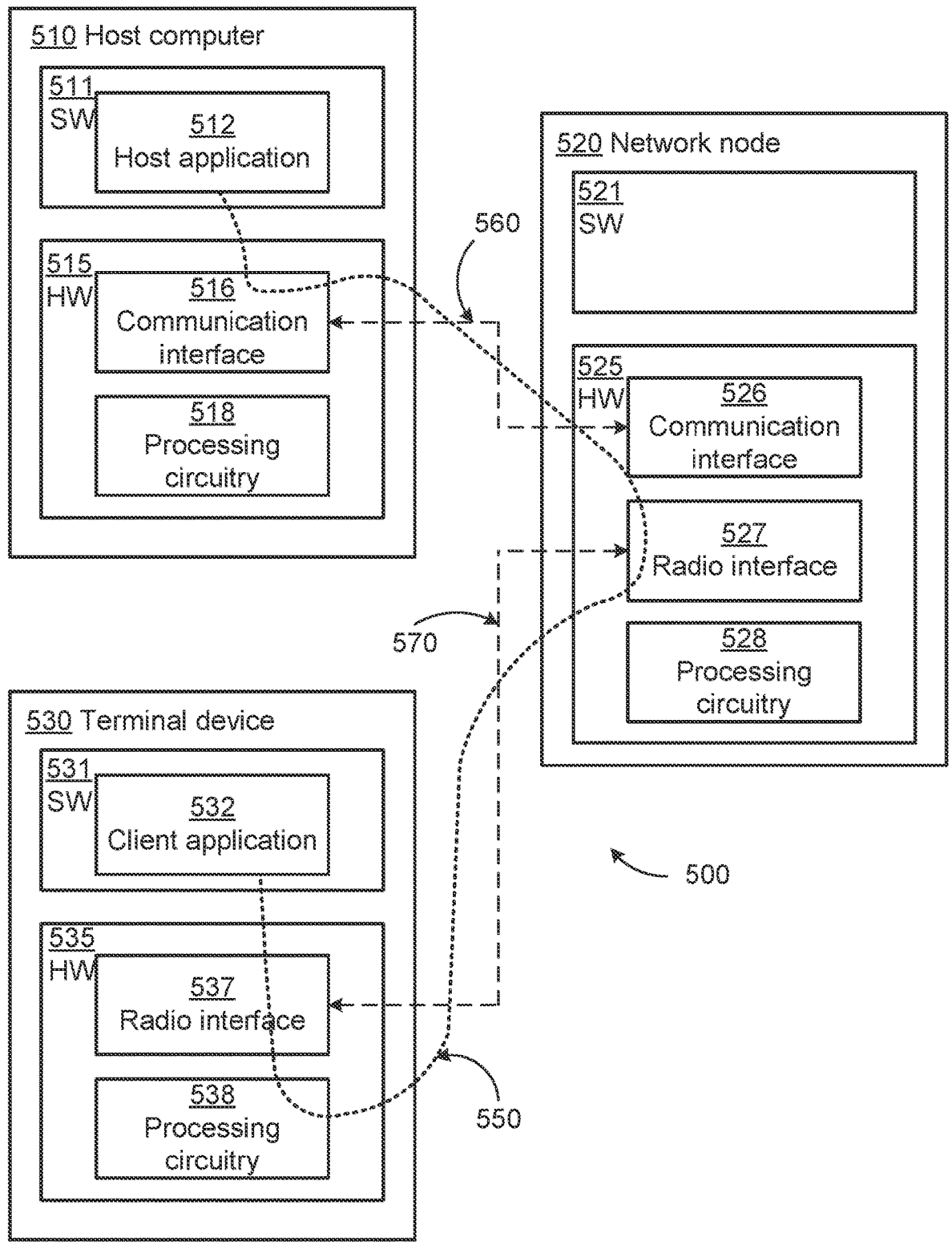
FIG. 9 is a schematic diagram illustrating host computer communicating via a radio base station with a terminal device over a partially wireless connection in accordance with some embodiments.

FIG. 9 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal devices 160a:160f of FIGS. 1, 3, and 4. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 200 of FIGS. 1, 3, and 4. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by radio access network node 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 9 may be similar or identical to host computer 430, one of network nodes 412a, 412b, 412c and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A network node for beamformed transmission towards a first group of terminal devices, wherein each terminal device in the first group of terminal devices is configured with a bandwidth part (BWP) set comprising an active BWP for the terminal device, the network node comprising:
   processing circuitry, the processing circuitry being configured to cause the network node to:
   for a new terminal device entering the first group of terminal devices, determine an active BWP based on frequency overlap avoidance with the active BWPs of the terminal devices already part of the first group;
   configure the new terminal device with the determined active BWP; and
   serve all terminal devices included in the first group by performing beamformed transmission towards the terminal devices in accordance with the active BWPs.

2. The network node of claim 1, wherein
the network node is further configured to obtain an overlap threshold value, and
the network node is configured to determine the active BWP for the new terminal device based on: i) the overlap threshold value and ii) for each terminal device in the first group of terminal devices, the terminal device's active BWP.

3. The network node of claim 2, wherein the network node is configured to determine the active BWP for the new terminal based on: i) the overlap threshold value and ii) for each terminal device in the first group of terminal devices, the terminal device's active BWP by performing a process that comprises:
setting the active BWP for the new terminal device such that, for each terminal device in the first group of terminal devices that has an active BWP that overlaps the active BWP for the new terminal device, the terminal device's active BWP overlaps the active BWP for the new terminal device an amount that is not greater than the overlap threshold.

4. The network node of claim 2, wherein obtaining the overlap threshold value comprises setting the overlap threshold value based on a traffic need for the new terminal device.

5. The network node of claim 1, wherein the terminal devices are grouped according to a spatial relation criterion.

6. The network node of claim 1, wherein the terminal devices are grouped according to a traffic need criterion.

7. The network node of claim 1, wherein there are at least two different sizes of the BWPs.

8. The network node of claim 1, wherein determining the active BWP further comprises determining the size of the active BWP.

9. The network node of claim 1, wherein configuring the new terminal device with the active BWP comprises signaling the active BWP to the new terminal device.

10. The network node of claim 1, wherein
prior to the new terminal device entering the first group of terminal devices, the first group of terminal devices comprises a first terminal device, and
the network node is further configured to reconfigure the first terminal device with a new active BWP.

11. The network node of claim 10, wherein the network node is configured to reconfigure the first terminal device with the new active BWP based on frequency overlap avoidance with the active BWPs of the remaining terminal devices already part of the first group and the active BWP of the new terminal device.

12. The network node of claim 1, wherein the new terminal device is configured with a default BWP set, and wherein the active BWP with which the new terminal device is configured is selected from the default BWP set.

13. The network node of claim 1, wherein the new terminal device is configured with a default BWP set, and wherein the active BWP with which the new terminal device is configured is selected outside the default BWP set.

14. The network node of claim 1, wherein the new terminal device is handed over from a transmission beam serving a second group of terminal devices.

15. The network node of claim 1, wherein the new terminal device is handed over to the network node from another network node.

16. The network node of claim 1, wherein the new terminal device is entered into the first group upon the network node having received a request for initial network access from the new terminal device.

17. The network node of claim 1, wherein each BWP set comprises at least four BWPs, one of which being the active BWP.

18. The network node of claim 1, wherein each BWP set partly covers a carrier bandwidth.

19. The network node of claim 1, wherein the network node is configured to serve the terminal devices using analog beamforming.

20. A non-transitory computer readable medium storing a computer program for beamformed transmission towards a first group of terminal devices, wherein each terminal device in the first group of terminal devices is configured with a bandwidth part (BWP) set comprising an active BWP for the terminal device, the computer program comprising computer code which, when run on processing circuitry of a network node, causes the network node to:
for a new terminal device entering the first group of terminal devices, determine an active BWP based on frequency overlap avoidance with the active BWPs of the terminal devices already part of the first group;
configure the new terminal device with the determined active BWP; and
serve all terminal devices included in the first group by performing beamformed transmission towards the terminal devices in accordance with the active BWPs.

* * * * *